Figure 1:
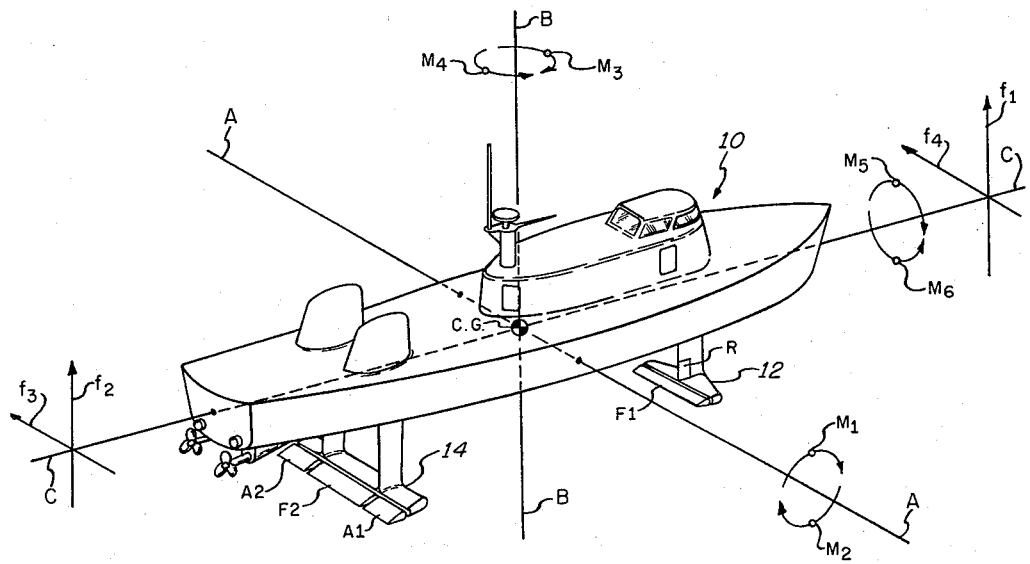

INVENTORS
HENRY E. HARRIS JR.
THOMAS F. NOBLE
VIRGEL E. WILLIAMS
BY
ATTORNEY

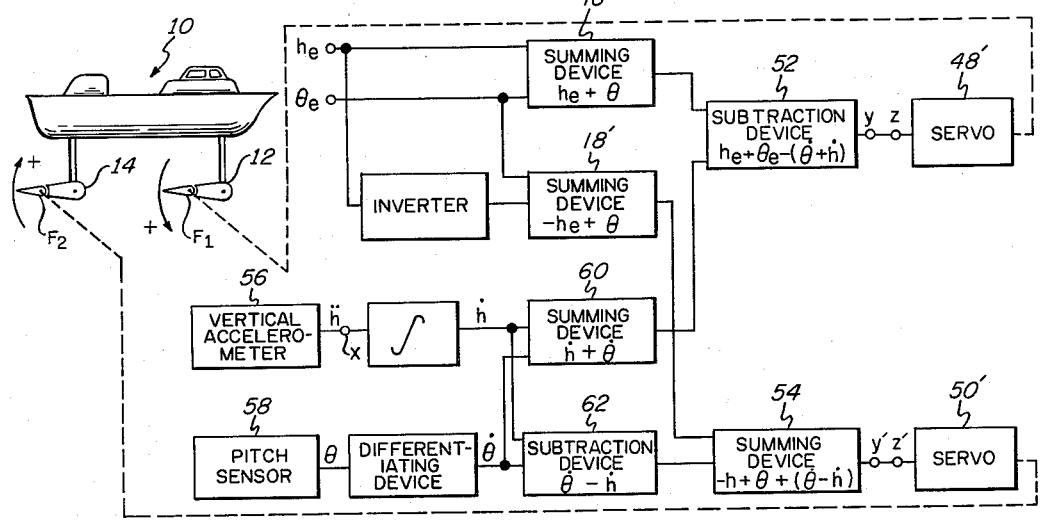
FIG. 4.
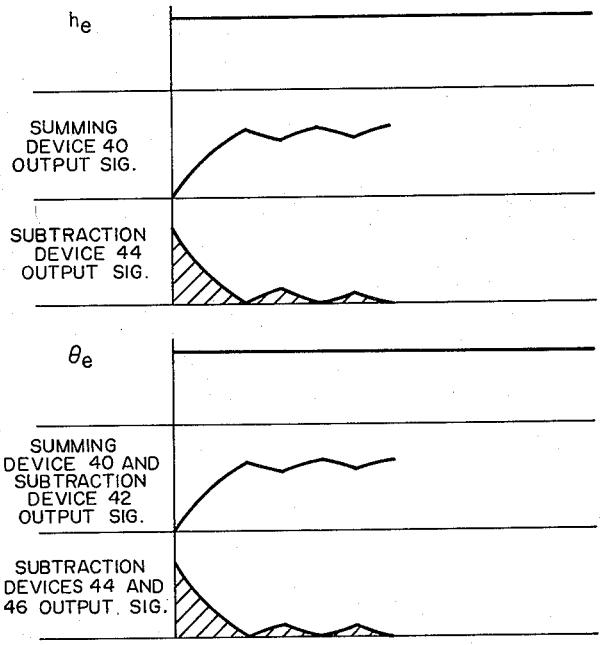
FIG. 3a.
FIG. 3b.
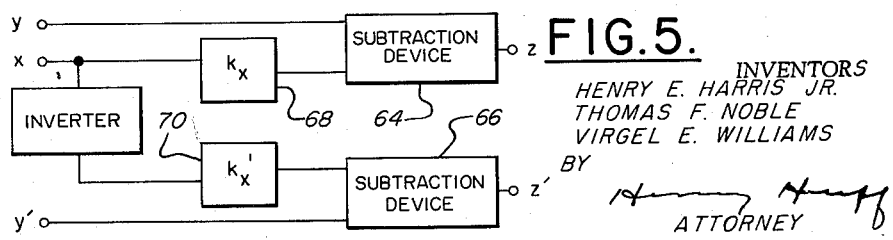
FIG. 5.
INVENTORS
HENRY E. HARRIS JR.
THOMAS F. NOBLE
VIRGEL E. WILLIAMS
BY
ATTORNEY

3,137,260
CONTROL SYSTEM

Henry E. Harris, Jr., Thomas F. Noble, and Virgel E. Williams, Charlottesville, Va., assignors to Sperry Rand Corporation, Great Neck, N.Y., a corporation of Delaware
Filed Apr. 3, 1962, Ser. No. 184,836
9 Claims. (Cl. 114—66.5)

This invention relates in general to automatic pilots and more particularly to such apparatus as is usable with hydrofoil sea craft, i.e. craft which is supported, not by buoyant forces, but by the lifts of under-sea foils.

Hydrofoil craft, unlike aircraft, are provided usually with forward and aft control surfaces which operate simultaneously to effect commanded motions. For example, to increase pitch, a forward control surface is lowered while an aft control surface is raised, thereby providing a pitching moment; to increase height (above the water line) both control surfaces are lowered simultaneously. Because the craft center of gravity is (normally) not coincidental with its geometric center, a change in the resultant lift force occurs whenever a change in pitch is commanded; similarly, a commanded change in lift causes a corresponding resultant pitching moment. Should the resultant lift force or pitching moment so change as to cause "foil broaching" or "hull slamming," serious damage to the craft can result.

Apparatus embodying the present invention operates to control the movement of hydrofoil craft and assures that only commanded motions or particular combinations of motions will occur, such assurance being had by positioning each respective control surface in response to a signal representing the difference between commanded and uncommanded motions. For example, in changing height, a signal is applied to drive the forward and aft control surfaces which equals a height error signal, i.e. a signal representing the error between the actual and desired height, less a signal representing the algebraic sum of the pitching moments about the craft center of gravity. So long as there is no uncommanded pitching motion, the error signal alone is the applied signal; however, as soon as such uncommanded motion starts to occur, the applied error signal is minimized in proportion to that motion, thereby causing the craft to return to a state of equilibrium or continue to effect the commanded motion only.

A principal object of the invention is to provide an automatic system for use in controlling the attitude of a hydrofoil craft.

Another object of the invention is to provide an automatic control system for hydrofoil craft which substantially prevents uncommanded motions from occurring.

Another object of the invention is to provide automatic pilot apparatus for hydrofoil craft that operates to effect only commanded motions.

Another object of the invention is to provide a control system for use with hydrofoil sea craft which assures against foil broaching and hull slamming.

Figure 2:
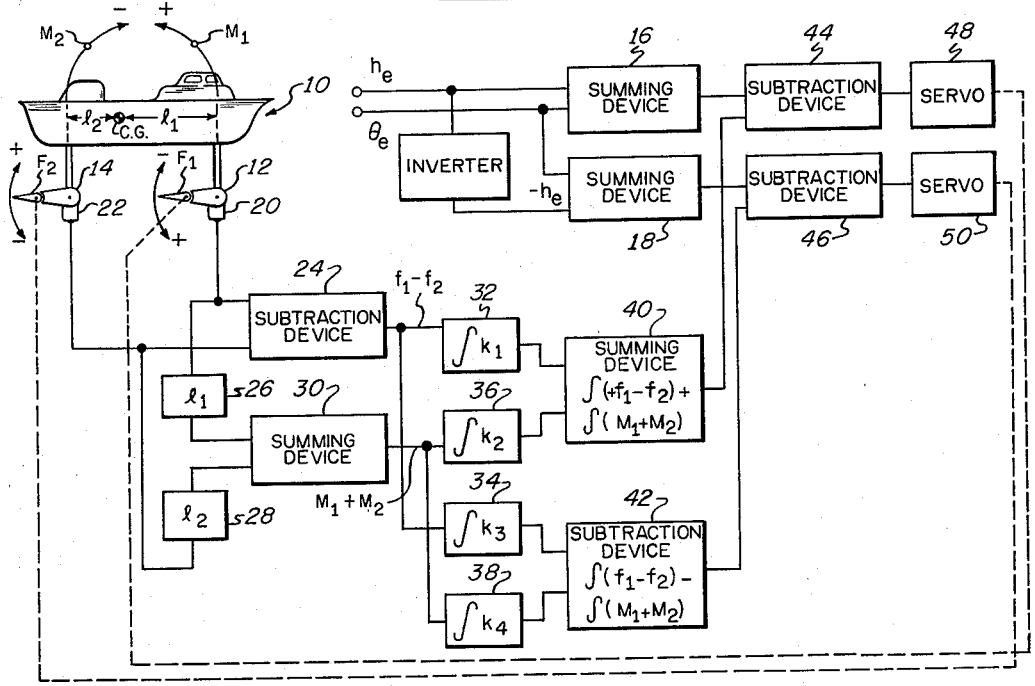
Figure 6:
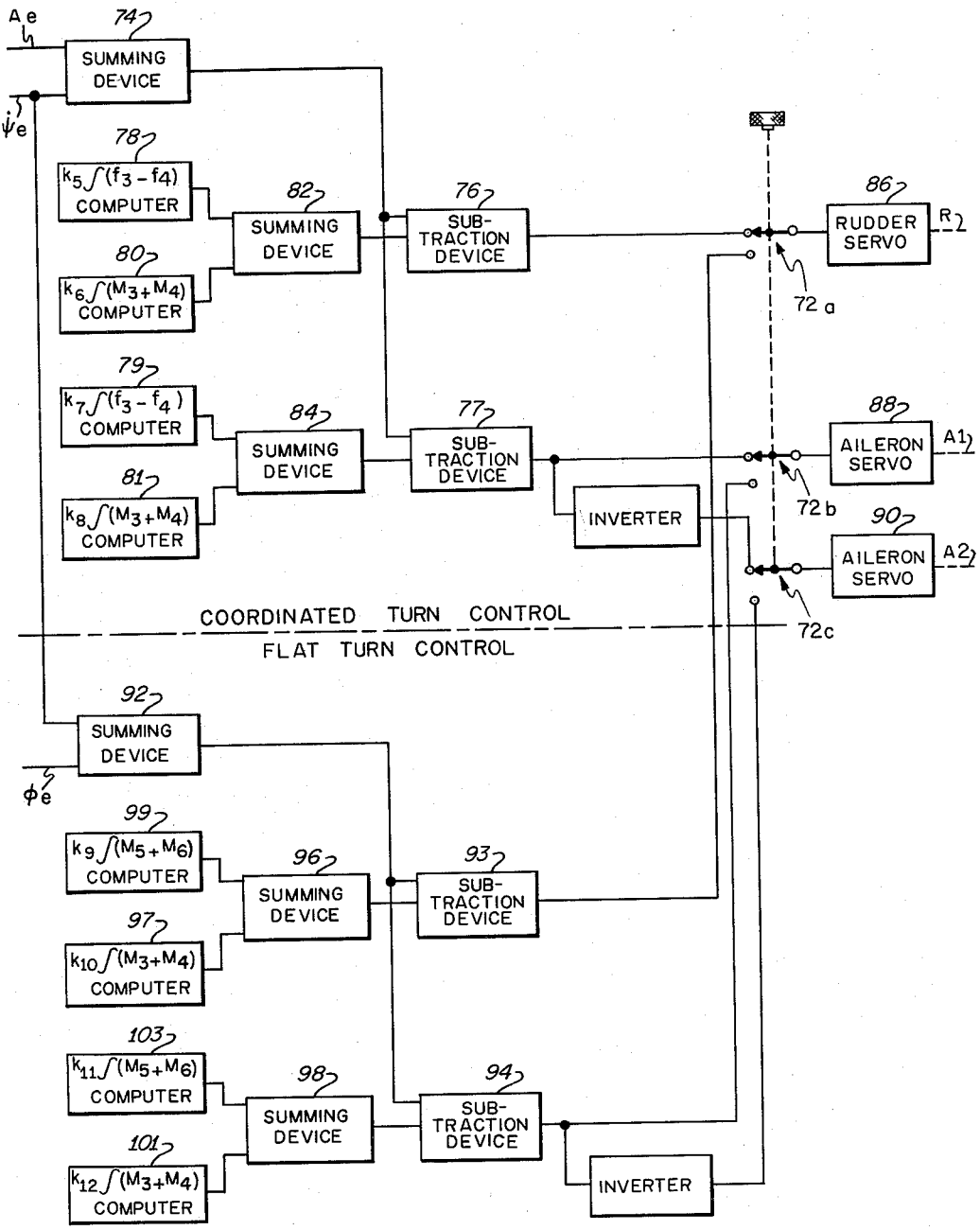

The invention will be described with reference to the figures wherein:

FIG. 1 is a perspective view of a hydrofoil sea craft showing its body axes,

FIG. 2 is a block diagram of a control system embodying the invention which is useful in controlling movement of the craft in its vertical plane, FIG. 3a and 3b are diagrams useful in describing the apparatus of FIG. 2, FIG. 4 is a block diagram of a species of the invention, FIG. 5 is a block diagram of a device which, when interconnected to the apparatus of FIG. 4, provides an improved embodiment thereof, and FIG. 6 is a block diagram of apparatus embodying the invention which is useful in controlling a hydrofoil sea craft during coordinated and flat curves.

Referring to FIG. 1, a hydrofoil craft 10 has foils 12 and 14, each with respective control surfaces F1 and F2 that cooperate to position the craft in the vertical plane. In changing boat height (above the water) the surfaces F1 and F2 are moved in the same direction, e.g. both up or both down; in changing the boat pitch attitude the surfaces F1 and F2 are moved in counterdirections, i.e. one up and one down. With height changes, the moments $M_1$ and $M_2$ should exactly cancel; otherwise a pitch moment about the axis A—A occurs. With pitch changes, the moments $M_1$ and $M_2$ additively combine; however, the resultant lift along the axis B—B (resulting from forces $f_1$ and $f_2$) must, at this time, remain constant, i.e. exactly equal the weight of the craft. Otherwise, the craft will move along its axis B—B.

A rudder R and ailerons A1 and A2 operate to position the boat in the horizontal plane. During a flat turn, movement of the craft about its roll axis C—C should not occur; during a coordinated turn, movement of the craft along its axis A—A should not occur. Control of the craft in the horizontal plane by apparatus employing the invention is analogous to control of the craft in the vertical plane, with commanded craft motion about the axis B—B being permitted and uncommanded motions about the axis C—C (during a flat turn) and along the axis A—A (during a coordinated turn) being prevented.

Referring to FIG. 2 a summing device 16 is adapted to receive signals $h_e$ and $\theta_e$ (each of which may contain stability components) representing height and pitch displacement errors respectively; a summing device 18 receives the pitch error signal and a signal which is the inverse from the height error signal. Lift sensors 20 and 22, e.g. strain gauges such as are shown in FIG. 7 of U.S. Patent 2,553,546, filed in the name of R. Brannon and assigned to the present assignee, produce signals $f_1$ and $f_2$ representing the lifts provided respectively by the forward and aft foils 12 and 14 of the hydrofoil craft 10. The lift signals are applied to a subtraction device 24 which provides an output signal $(f_1-f_2)$. The signal $f_1$ provided by the sensor 20 is applied to a multiplier 26 and there multiplied by a signal representing the distance between the forward foil 12 and the craft center of gravity, thereby providing a multiplier output signal representing the moment $M_1$. The signal $f_2$ provided by the sensor 22 is applied to a multiplier 28 and there multiplied by a signal representing the distance between the aft foil 14 and the craft center of gravity, thereby providing a multiplier output signal representing the moment $M_2$. The moment signals $M_1$ and $M_2$ are applied to a summing device 30.

The signal $(f_1-f_2)$ at the output of the subtraction device 24 is applied to integrators 32 and 34, each having respective constants of integration. The signal $(M_1+M_2)$ at the output of the summing device 30 is applied to integrators 36 and 38 also having respective constants of integration. (Such constants depend on a variety of factors as, for example, craft configuration, foil geometry, control system gain, etc.) The integrated lift difference and moment sum signals (at the outputs of the integrators 32 and 36 respectively) are applied to a summing device 40; the integrated lift difference and moment sum signals (at the outputs of the integrators 34 and 38 respectively) are applied to a subtraction device 42 which produces an output signal representing the integrated lift difference signal less the integrated moment sum signal. The output signals from the summing devices 16 and 18 are applied respectively to subtraction devices 44 and 46. The summing device 16 output signal has subtracted therefrom the output signal from the summing device 40; the summing device 18 output signal has subtracted therefrom the output signal from the subtraction device 42. A servo 48 receives the subtraction device 44 output signal and operates the control surface F1 of the forward foil in proportion thereto; a servo 50 receives the subtraction device 46 output signal and operates the control surface F2 of the aft foil 14 in proportion thereto. The servos 48 and 50 position the control surfaces F1 and F2 in counterdirections when they receive signals of the same sense.

In explaining the functioning of the apparatus of FIG. 2, reference should be had to FIGS. 3a and 3b which, for instructive purposes, depict hypothetical situations wherein the height error signal and the pitch error signal are held constant respectively. With application of only a height error signal, the control surfaces F1 and F2 must both move in the same direction. For example, in increasing boat height the control surfaces F1 and F2 must both move down, i.e. the height error signal is positive and the signals applied to the servos 48 and 50 are respectively positive and negative. At the instant the control surfaces are deflected, the craft experiences a height changing resultant force. However, at the same time the craft also experiences a pitch changing moment (because the moment $M_1$ is greater than the moment $M_2$) which causes positive signals to appear gradually at the output of the integrators 36 and 38. The positive output signal from the subtraction device 44 is then decreased in proportion to the output signal from the summing device 40; likewise, the negative output signal from the subtraction device 46 is decreased (i.e. changed in positive direction) in proportion to the output signal from the subtraction device 42 (which operates always to invert the output signals from the integrator 38). This last-mentioned happening is not shown in the figures since it is a "mirror" depiction of what is shown in FIG. 3a. As a result, the control surfaces F1 and F2 start to and eventually become streamlined, this being when the subtraction devices 44 and 46 have no output signals. Thereafter the actual and inverted height error signals hold the output signals from the subtraction devices 44 and 46 at substantially zero with only ripple-like height changing signals being applied to the servos.

In the situation where a constant positive pitch error signal is applied to the summing devices 16 and 18, the servos 48 and 50 instantly drive the control surfaces F1 and F2 in counterdirections, i.e. F1 down and F2 up. Because the craft center of gravity is not coincident with its geometric center, the increased lift afforded by the forward foil does not compensate sufficiently for the decrease in lift afforded by the aft foil, thereby causing the craft to descend toward the water. With the forward lift $f_1$ greater than the aft lift $f_2$, the subtraction device 24 produces a positive output signal. After integration (by the integrators 32 and 34) and application through the summing and subtraction devices 40 and 42 respectively, the integrated lift difference signals (which are both positive) are applied to the subtraction devices 44 and 46, thereby cancelling the applied constant positive pitch error signals in the manner described with reference to the application of a constant height error signal.

It is to be noted that even without application of pitch error or height error signals, the lift difference and moment sum signals, $(f_1-f_2)$ and $(M_1+M_2)$, are ever present, thereby providing continuous stability control of the craft in its vertical plane.

The lift difference signal $(f_1-f_2)$ and the moment sum signal $(M_1+M_2)$ are representative respectively of accelerations along the axis B—B and about the axis A—A; accordingly, the output signals from the integrators 32 and 34 are representative of the craft vertical rate and the output signals from the integrators 36 and 38 are representative of the craft pitch rate. The apparatus of FIG. 4 employs this extension of the basic concept and modifies the signals applied to the control surface servos in proportion to the magnitudes of uncommanded pitch rate and vertical rate signals. In FIG. 4, summing devices 16' and 18' receive respectively the height error signal and the inverse form of that signal. In addition, the summing devices 16' and 18' receive the pitch error signal. The summing device 16' output signal is applied to a subtraction device 52 and the summing device 18' output signal is applied to a summing device 54. A signal representing craft vertical rate is provided by integrating the output signal from a vertical accelerometer 56. A signal representing craft pitch rate is provided by differentiating the output signal from a pitch attitude sensor 58, e.g. a vertical gyro. The height rate and pitch rate signals are applied both to a summing device 60 and to a subtraction device 62 which provide respectively signal $(\dot{h}+\dot{\theta})$ and $(\dot{\theta}-\dot{h})$. The signal $(\dot{h}+\dot{\theta})$ is applied to the subtraction device 52 and subtracted from the output signal from the summing device 16'; the output signal $(\dot{\theta}-\dot{h})$ is applied to the summing device 54 and added to the output signal from the summing device 18'. The subtraction device 52 output signal is applied to a forward control surface servo 48' and the summing device 54 output signal is applied to an aft control surface servo 50'.

With application of a positive height error signal to the summing device 16' (and, therefore, application of a negative signal to the summing device 18'), the control surfaces F1 and F2 instantly move downward. As this occurs, a positive pitch rate signal is applied to the subtraction device 52 and to the summing device 54, thereby causing the output signals from the subtraction device 52 and the summing device 54 to be cancelled. Hence, the control surfaces F1 and F2 return to their streamlined positions and operate in the manner aforedescribed with reference to FIG. 3a. With application of a positive pitch error signal to the summing devices 16' and 18', the servos 48' and 50' instantly counterposition the control surfaces F1 and F2. However, as a height rate signal $\dot{h}$ starts to appear, the positive pitch error signals applied to the subtraction device 52 and the summing device 54 are cancelled. This is because the summing device 60 produces a positive signal $(\dot{h})$ which is subtracted from the positive signal $(\theta_e)$ applied to the subtraction device 52, and because the subtraction device 62 produces a negative signal $(-\dot{h})$ which is algebraically added to the positive signal $(\theta_e)$. Hence, the control surfaces F1 and F2 return to their streamlined positions and operate in the manner aforedescribed with reference to FIG. 3b.

Since it is important to avoid foil broaching and hull slamming, apparatus embodying the present invention has, in its preferred form, the signals which are applied to the forward and aft control surfaces reduced further in proportion to a vertical motion anticipation signal $\ddot{h}$. FIG. 5 shows a circuit adapted to be connected between the contacts Y, Y' and Z, Z' of the apparatus shown in FIG. 4. In FIG. 5, subtraction devices 64 and 66 receive respectively the output signals from the subtraction device 52 and the summing device 54. A signal $\ddot{h}$ is applied through an attenuator 68 to the subtraction device 64 and a signal $-\ddot{h}$ is applied through an attenuator 70 to the subtraction device 66. The subtraction devices 64 and 66 have their output signals applied respectively to the servos 48' and 50'. Should an appreciable fast height change occur when a pitch change is commanded, the output signal at point X will operate immediately to negate the commanded pitch signal and thereby prevent unexpected foil broaching or hull slamming. When height changes are commanded, the signals provided by the summing circuits 64 and 66 serve to damp the vertical motion.

As stated earlier, apparatus embodying the present invention may be utilized to control the hydrofoil craft in its horizontal plane. In coordinated turns, motion about craft axis B—B and C—C (see FIG. 1) is necessary, but motion along the axis A—A is to be prevented. In flat turns (effected in rough seas to assure continuous submersion of the boat foils) motion about the axis B—B is necessary, but motion about the axis C—C is to be prevented. To effect motion about the craft axis B—B, the rudder R and/or the ailerons A1 and A2 are operated, the ailerons A1 and A2 being moved in counterdirections at all times.

FIG. 6 shows apparatus embodying the invention which provides both coordinated and flat turn control, i.e. when switches 72a, 72b and 72c thereof are in their upper positions coordinated turn control is provided and when in their lower positions a flat turn control is provided.

With the switches in their upper positions: a signal $\psi_e$ representing the error between an actual craft turn rate and a commanded turn rate is applied to a summing device 74. The summing device 74 also receives a signal representing the error between the craft acceleration along the axis A—A and a commanded acceleration, e.g. the "necessary" zero acceleration. The output signal from the summing device 74 is applied to subtraction devices 76 and 77. Computers 78 and 79 produce signals proportional to different time integrals of the difference between the forces which tend to move the craft along the axis A—A, i.e. $f_3$ and $f_4$. Computers 80 and 81 produce signals proportional to different time integrals of the moments about the axis B—B. These computers may comprise strain gauges and multipliers which cooperate in the manner described with relation to FIG. 2. A summing device 82 receives the output signals from the computers 78 and 80 and provides a signal representing their algebraic sum; a summing device 84 receives the output signals from the computers 79 and 81 and provides an output signal representing their algebraic sum. The summing device 82 output signal is applied to the subtraction device 76 and there attenuates the output signal from the summing device 74 proportionately. Similarly, the output signal from the summing device 84 proportionately attenuates the summing device 74 output signal. The subtraction device 76 output signal is applied through the switch 72a to a rudder servo 86 and the subtraction device 77 output signal is applied through the switch 72b to an aileron servo 88 and after inversion by an inverter 89, through the switch 72c to an aileron servo 90.

When commanding a coordinated turn, a turn rate error signal is applied to the summing device 74; instantly the subtraction circuits 76 and 77 produce output signals which cause the rudder and aileron servos to operate. As this happens, the computers 78 and 79 produce output signals in the manner described with reference to FIG. 2. These signals are then subtracted from the turn rate error signal and thereby cause the servos to seek their null positions. Should the turn rate signal be held constant, in the manner described with reference to FIGS. 3a and 3b, the servos after reaching their null positions will respond to ripple-like signals appearing at the outputs of the subtraction devices 76 and 77. Should there be no turn rate error signal applied to the summing device 74 and an acceleration error signal applied thereto instead, the craft will tend to turn about its axis B—B (in response to the resultant between the moments $M_3$ and $M_4$). When this occurs, the computers 80 and 81 will produce output signals which will negate the acceleration error signals applied to the subtraction devices 76 and 77 in the manner aforedescribed.

With flat turn control (switches 72a, 72b and 72c in their lower positions): the turn rate error signal is applied to a summing device 92; also applied to the summing device 92 is a signal representing the difference between the actual craft bank angle and a zero commanded craft bank angle. The summing device 92 has its output signal applied to subtraction devices 93 and 94 and there respectively reduced in proportion to output signals from summing devices 96 and 98. The summing device 96 receives signals from computers 97 and 99 representing respectively the time integrals of the moment differences about the axes B—B and C—C. The summing device 98 likewise receives signals from computers 101 and 103 representing respectively different time integrals of these moments. So long as there is no bank angle error signal, the summing device 92 output signal (representing only the turn rate error signal) is reduced in proportion to signals representing different time integrals of the algebraic sum of the moments $M_5$ and $M_6$. The presence of a bank angle error signal is reduced in proportion to time integrals of the difference between the moments $M_3$ and $M_4$ in the same manner that the acceleration (along the axis A—A) error signal was modified.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for controlling a craft comprising means providing an error signal proportional to the difference between a commanded attitude and a reference attitude for commanding craft motion about a first craft axis, means providing a signal proportional to an uncommanded motion substantially along a different craft axis occurring simultaneously with said commanded motion, means receiving both said signals providing a signal representing the difference therebetween, and servo means responsive to said difference signal to operate proportionately a control surface on said craft to move said craft about said first craft axis.

2. Apparatus for controlling a craft comprising means providing a first error signal proportional to the difference between a commanded attitude and a reference attitude for commanding craft motion about a first axis of said craft, means providing a signal proportional to the time integral of uncommanded motion substantially along a different axis of said craft and occurring simultaneously with said commanded motion, means receiving both said signals providing a second error signal representing the difference therebetween, and servo means responsive to operate a craft control surface in proportion to said second error signal, thereby effecting the commanded motion.

3. Apparatus for controlling a hydrofoil craft in its vertical plane, said craft being provided with forward and aft control surfaces, comprising means producing a signal representing a craft pitch displacement error, means producing a signal representing a craft height displacement error, means producing a signal proportional to the difference between the lifts provided by the forward and aft control surfaces, means producing a signal proportional to the algebraic sum of the craft pitching moments about its center of gravity, means cancelling said pitch displacement error signal in proportion to said lift difference signal and said height displacement error signal in proportion to said moment sum signal, producing modified pitch and height displacement error signals, servo means adapted to receive said modified error signals responsive to operate said forward and aft control surfaces in proportion thereto, whereby said control surfaces move in counter directions in response to pitch error signals and similar directions in response to height error signals.

4. Apparatus for controlling a craft comprising means providing a signal proportional to the difference between a commanded attitude and a reference attitude for commanding craft motion about a first craft axis, means providing a signal proportional to time integral of the uncommanded motion substantially along a different craft axis occurring simultaneously with said commanded motion, means receiving both said signals providing a second error signal representing the difference therebetween, and servo means responsive to said second error signal to operate proportionately a control surface on said craft, thereby effecting the commanded motion.

5. Apparatus for controlling a hydrofoil craft in its vertical plane comprising forward and aft servo means adapted to position simultaneously forward and aft control surfaces on said craft, means producing a signal representing craft height relative to a commanded height, means producing a signal representing craft pitch relative to a commanded pitch, means producing a signal proportional to the difference between the lifts provided by the forward and aft foils, means producing a signal proportional to the algebraic sum of the moments about the craft center of gravity in the vertical plane, means receiving all said signals cancelling said height difference signal in proportion to said moment signal and cancelling said pitch difference signal in proportion to said lift difference signal, said modified height difference signal being applied to drive one servo means in one direction and said other servo means in the other direction, and said modified pitch difference signal being applied to drive both servo means in the same direction.

6. Apparatus for use in controlling a craft during a coordinated turn, said craft being provided with aileron control surfaces comprising means providing a first error signal for controlling the craft in azimuth, means providing a signal proportional to the difference between the forces tending to move the craft substantially along its pitch axis, means receiving both said signals producing a second error signal representing the difference therebetween, and servo means operable with said aileron control surfaces responsive to said second error signal to turn said craft.

7. Apparatus for use in controlling a craft during a coordinated turn, said craft being provided with aileron control surfaces comprising means providing a first error signal for controlling the craft in azimuth, means providing a signal proportional to the time integral of the difference between the forces tending to move the craft substantially along its pitch axis, means receiving both said signals producing a second error signal representing the difference therebetween, and servo means operable with said aileron control surfaces responsive to said second error signal to turn said craft.

8. Apparatus for controlling a hydrofoil craft in its vertical plane, said craft being provided with forward and aft control surfaces, comprising means producing a signal representing a craft pitch displacement error, means producing a signal representing a craft height displacement error, means producing a signal proportional to the vertical rate, means producing a signal proportional to the pitch rate, means cancelling said pitch displacement error signal in proportion to said vertical rate signal and said height displacement error signal in proportion to said pitch rate signal, thereby producing modified pitch and height displacement error signals, servo means adapted to receive said modified error signals responsive to operate said forward and aft control surfaces in proportion thereto, whereby said control surfaces move in counter directions in response to pitch error signals and similar directions in response to height error signals.

9. Apparatus for controlling a hydrofoil craft in its vertical plane comprising forward and aft servo means adapted to position simultaneously forward and aft control surfaces on said craft, means producing a signal representing craft height relative to a commanded height, means producing a signal representing craft pitch relative to a commanded pitch, means producing a signal proportional to the vertical rate, means producing a signal proportional to the pitch rate, means receiving all said signals cancelling said height difference signal in proportion to said pitch rate signal and cancelling said pitch difference signal in proportion to said vertical rate, said modified height difference signal being applied to drive one servo means in one direction and said other servo means in the other direction, and said modified pitch difference signal being applied to drive both servo means in the same direction.

References Cited in the file of this patent

UNITED STATES PATENTS

| | | |
|---|---|---|
| 2,808,999 | Chenery | Oct. 8, 1957 |
| 2,977,070 | Burner | Mar. 28, 1961 |
| 2,986,109 | Kittleman | May 30, 1961 |
| 2,998,946 | Jude et al. | Sept. 5, 1961 |
| 3,070,332 | Hess | Dec. 25, 1962 |
| 3,081,728 | Wilterdink | Mar. 19, 1963 |